United States Patent
French et al.

(10) Patent No.: US 9,922,521 B1
(45) Date of Patent: Mar. 20, 2018

(54) DETECTING ISOLATED GROUP MEMBERS

(71) Applicant: International Business Machines Corporation, Armonk, NY (US)

(72) Inventors: Paul French, Cork (IE); Jack Healy, Cork (IE); Niall Lucey, Cork (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/408,375

(22) Filed: Jan. 17, 2017

(51) Int. Cl.
*G08B 23/00* (2006.01)
*G08B 21/02* (2006.01)
*H04W 4/02* (2018.01)
*G08B 25/10* (2006.01)

(52) U.S. Cl.
CPC ..... *G08B 21/0261* (2013.01); *G08B 21/0227* (2013.01); *G08B 25/10* (2013.01); *H04W 4/023* (2013.01)

(58) Field of Classification Search
CPC ........... G08B 21/0261; G08B 21/0266; H04W 4/021; H04W 8/0005; H04W 4/06; H04W 36/00; H04B 7/00
USPC ... 340/573.4, 573.1, 539.13, 539.11, 539.15; 455/456.6, 456.1
See application file for complete search history.

(56) References Cited

U.S. PATENT DOCUMENTS

| | | | |
|---|---|---|---|
| 8,116,748 B2 | 2/2012 | Aaron | |
| 8,406,769 B2 * | 3/2013 | Suzuki | G06Q 10/06 455/439 |
| 2005/0200487 A1 | 9/2005 | O'Donnell et al. | |
| 2012/0157081 A1 | 6/2012 | Suzuki | |
| 2013/0324166 A1 | 12/2013 | Mian et al. | |
| 2015/0237477 A1 | 8/2015 | Yu et al. | |

FOREIGN PATENT DOCUMENTS

WO   WO2016/036853   3/2016

OTHER PUBLICATIONS

Garvey, Jude, "Kiddo proximity alarm system offers parents peace of mind," newatlas.com, Feb. 18, 2008.

* cited by examiner

*Primary Examiner* — Toan N Pham
(74) *Attorney, Agent, or Firm* — Steven M. Greenberg, Esq.; CRGO LAW

(57) ABSTRACT

Embodiments of the invention provide a method, system and computer program product for detecting isolated group members. The method includes defining in memory of a master computer, a group of individuals each with a corresponding one of a multiplicity of registered mobile devices. The method also includes collecting in the master computer geographic location data for each of the mobile devices along with an effective line of sight with others of the individuals. The method yet further includes computing a coefficient of isolation for each of the individuals based upon the collected geographic location data and the determination of an absence or presence of an effective line of sight with different other individuals in the group, each of the coefficients indicating a degree of isolation of a corresponding one of the individuals. Finally, the method includes storing the coefficients in a table.

20 Claims, 2 Drawing Sheets

DETECTING ISOLATED GROUP MEMBERS

BACKGROUND OF THE INVENTION

Field of the Invention

The present invention relates to electronic monitoring and more particularly to electronic tethering of individuals in a defined group.

Description of the Related Art

Electronic monitoring is a form of remote sensing in which freely moving individuals are monitored as to the location and movement of the monitored individuals. Oftentimes, electronic monitoring is coupled with notions of geo-fencing so as to trigger a notification only when a monitored individual strays from or enters into a defined geographic perimeter. Electronic tethering is a form of electronic monitoring in which a monitored individual is logically coupled to a fixed point or area such that the movement of the monitored individual beyond a threshold distance from the fixed point or area triggers a notification.

Electronic monitoring and tethering has been extended to the notion of group chaperoning. In this regard, in the context of group chaperoning, members of a defined group such as a group of children are instrumented with sensors such that when one or more members of the group stray a threshold distance from the rest of the group, an alert is generated in respect to the chaperone of the group.

BRIEF SUMMARY OF THE INVENTION

Embodiments of the present invention address deficiencies of the art in respect to electronic tethering and provide a novel and non-obvious method, system and computer program product for detecting isolated group members. In an embodiment of the invention, a method of detecting isolated group members includes defining in memory of a master computer, a group of individuals each with a corresponding one of a multiplicity of registered mobile devices. The method also includes collecting in the master computer geographic location data for each of the mobile devices along with a degree to which line of sight exists between each of the individuals in the group. The method yet further includes computing a coefficient of isolation for each of the individuals based upon the collected geographic location data and the degree to which for each one of the individuals in the group, line of sight exists between each other of the individuals in the group, each of the coefficients indicating a degree of isolation of a corresponding one of the individuals. Finally, the method includes storing each coefficient of isolation in a table and providing an interface to each coefficient of isolation in the table. Optionally, on condition of one of the computed coefficients indicating a threshold isolation or a rate of change of one of the computed coefficients indicating a likelihood of threshold isolation of a corresponding one of the individuals, an alert is transmitted to at least one of the individuals or to a third party individual monitoring the group.

In one aspect of the embodiment, interactivity data is collected for each of the individuals in the group, a degree of communicative interactivity between each of the individuals is computed for each of the individuals and factored into the computation of the co-efficient for each of the individuals. For instance, the interactivity data may be collected for a corresponding one of the individuals as to indicate a recency of communications between the corresponding one of the individuals and at least one other of the individuals in the group. In yet another aspect of the embodiment, the coefficient is computed for each of the individuals based upon a statistical function of multiple different samples of the collected geographic location data and the degree to which line of sight exists between each of the individuals in the group. In even yet another aspect of the embodiment, the geographic location data and the degree to which line of sight exists between each of the individuals in the group are collected on a synchronized basis. However, as an alternative, the geographic location data is collected at different times for respectively different ones of the individuals and then logically synchronized by dead reckoning the geographic location data for each of the individuals for a specified moment in time.

In another embodiment of the invention, an electronic monitoring data processing system is configured for detecting isolated group members. The system includes a host computing platform with one or more computers, each with memory and at least one processor. The system also includes a group monitoring module executing in the memory of the host computing platform. The module includes program code that when executing in the memory of the host computing platform, defines a group of individuals each with a corresponding one of a multiplicity of registered mobile devices communicatively coupled to the host computing platform, collects computer geographic location data for each of the mobile devices along with a degree to which line of sight exists between each of the individuals in the group, computes a coefficient of isolation for each of the individuals based upon the collected geographic location data and the the degree to which line of sight exists between each of the individuals in the group, each of the coefficients indicating a degree of isolation of a corresponding one of the individuals, and, storing each coefficient of isolation in a table and providing an interface to each coefficient of isolation in the table.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for detecting isolated group members. In accordance with an embodiment of the invention, a set of individuals are defined as a group, with each of the individuals being associated with a corresponding mobile device. Thereafter, a geographic position of each of the individuals are periodically received along with a degree to which line of sight exists between each of the individuals in the group. Optionally, interactivity data is collected for each of the individuals in the group, the interactivity indicating a degree of communicative interactivity between each of the individuals is computed for each of the individuals and factored into the computation of the co-efficient for each of the individuals. A co-efficient of isolation is then computed for each of the individuals based upon the geographic position of the individual, the line of sight determination and optionally, the interactivity data. Each computed co-efficient is then stored in a table and access to the table provided for further analysis by way of an interface to the table. In further analyzing the table, to the extent that any one computed co-efficient for a corresponding individual in the group exceeds a threshold value, an alert is generated indicating that the corresponding individual of the group has become isolated.

Figure 1:
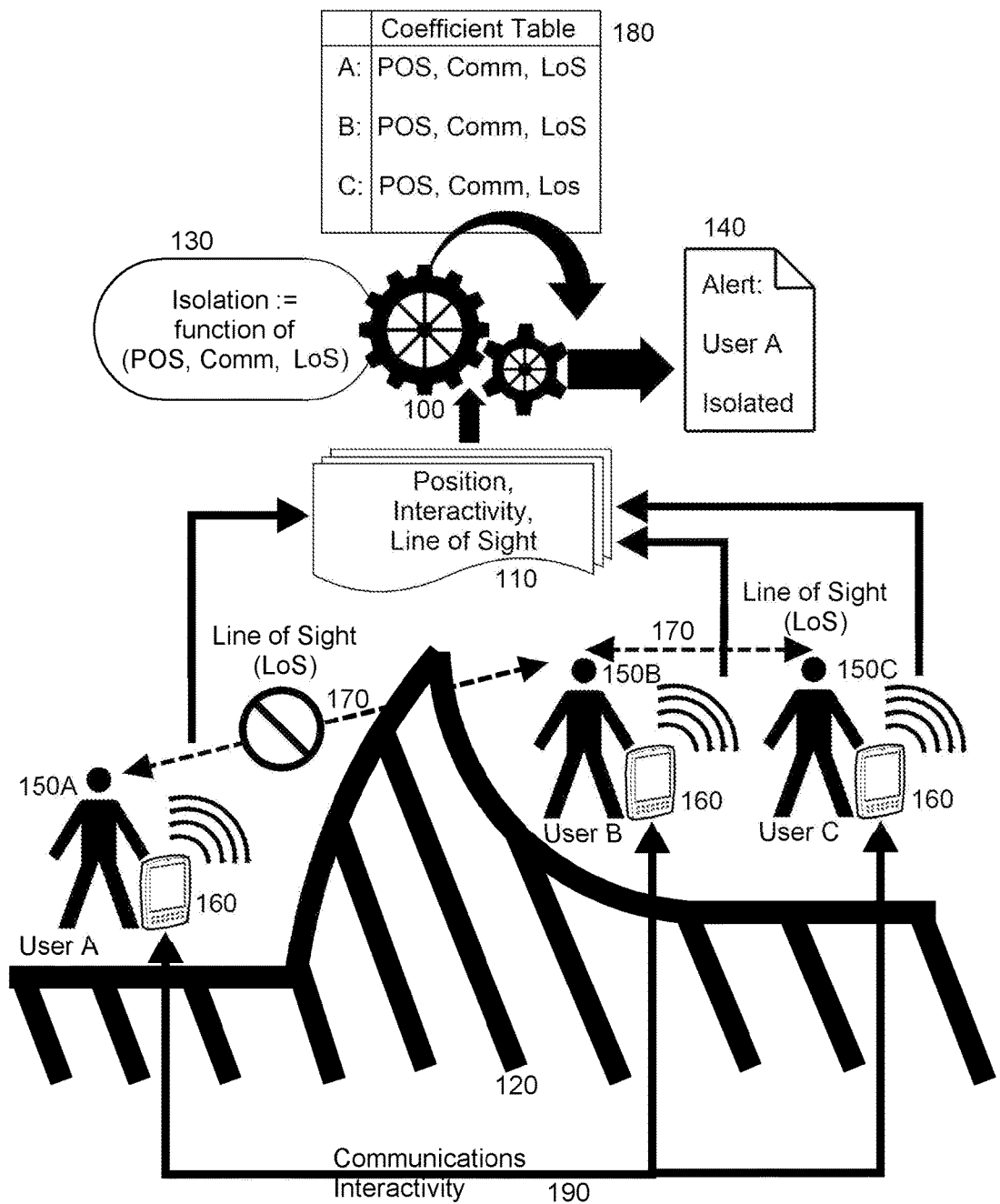
FIG. 1 is a pictorial illustration of a process for detecting isolated group members.

In further illustration, FIG. 1 is a pictorial illustration of a process for detecting isolated group members. As shown in FIG. 1, different individuals 150A, 150B, 150C positioned in a geographical space 120 are grouped together logically as a group. Each of the individuals 150A, 150B, 150C has a corresponding mobile device 160 such as a smart phone, personal digital assistant or smart watch, to name three examples. The mobile device 160 of each of the individuals 150A, 150B, 150C of the group transmit data 110 to isolation detection logic 100. Specifically, the data 110 includes a geographic position of each of the individuals 150A, 150B, 150C. Additionally, the data includes a degree to which line of sight 170 exists between each of the individuals 150A, 150B, 150C in the group. Even further, the data includes an indication of the communications interactivity 190 between the different individuals 150A, 150B, 150C, such as an indication of a frequency or recency of communications between the different individuals 150A, 150B, 150C including voice and data communications, as well as verbal or non-verbal communications, all of which may be determined based upon logging data in each mobile device 160 or in a third party computing system monitoring messaging and voice communications between the individuals 150A, 150B, 150C.

Using the data 110, the isolation detection logic 100 updates a coefficient table 180 with records for each of the individuals 150A, 150B, 150C including the geographical position, communications interactivity 190 and a presence or absence of the line of sight 170 as between each of the individuals 150A, 150B, 150C. Periodically, the isolation detection logic 100 computes an isolation coefficient 130 for each of the individuals 150A, 150B, 150C. The isolation coefficient 130 for each of the individuals 150A, 150B, 150C, is a function of the geographic position, communications interactivity 190 and line of sight 170 such that the scalar value that is the isolation coefficient 130. To the extent that the scalar value of the isolation coefficient 130 exceeds a threshold value, the isolation detection logic 100 broadcasts an alert 140 to a third party monitoring the individuals 150A, 150B, 150C, or to the different individuals 150A, 150B, 150C indicating a need to remediate the computed isolation of one of the individuals 150A, 150B, 150C with respect to the group of the individuals 150A, 150B, 150C.

In one optional aspect of the embodiment, any of the geographic position, communications interactivity 190 and line of sight 170 data may be individually weighted as part of the function. For example, a weight for each of the coefficients 130 for corresponding ones of the individuals 150A, 150B, 150C may be assigned. The weights can be based upon the perceived maturity of each of the individuals 150A, 150B, 150C, accounting for the trustworthiness of each of the individuals 150A, 150B, 150C and the ability of each of the individuals 150A, 150B, 150C to be easily-lead or otherwise be open to being manipulated or to act dangerously. As well, the weights can be computed to account for the proximity to one another of multiple ones of the individuals 150A, 150B, 150C perceived to be less mature so as to indicate a likelihood of the exercise of bad judgment by the cluster of the individuals 150A, 150B, 150C given a composition of ones of the individuals 150A, 150B, 150C each associated with immaturity and therefore, bad judgment and the absence from proximity of the individuals 150A, 150B, 150C of bad judgment, of one or more of the individuals 150A, 150B, 150C perceived to be mature and therefore of good judgment. In one aspect of the embodiment, the determination of maturity can be adjusted based upon detected decision making of each of the individuals 150A, 150B, 150C including a monitored favorable response by one of the individuals 150A, 150B, 150C resolving a computed isolation, or an unfavorable response by one of the individuals 150A, 150B, 150C failing to resolve a computed isolation.

In another optional aspect of the invention, it is recognized that the ability to geo-locate a particular one of the individuals 150A, 150B, 150C may be inhibited for technical reasons such as the failure to acquire a signal from requisite number of satellites in a positioning system cluster. In that instance, however, the isolation coefficient 130 for one of the individuals 150A, 150B, 150C may indicate an acceptable degree of isolation so long as line of sight exists as between a threshold number of the individuals 150A, 150B, 150C based upon, for example, near field communications with the threshold number of individuals. As well, the communications interactivity 190 of one of the individuals 150A, 150B, 150C with others of the individuals 150A, 150B, 150C utilizing near field communications or other types of communications may indicate an acceptable degree of isolation even though the acquisition of a geographic position of a corresponding one of the individuals 150A, 150B, 150C has become inhibited.

Finally, as an option, the data 110 includes an indication of whether or not an effective line of sight 170 exists as between each of the different individuals 150A, 150B, 150C. The line of sight 170 may be computed by providing pairs of coordinate sets of each of the individuals 150A, 150B, 150C to a geographic information system that computes whether or not line of sight exists between to objects of particular height, such as the average height of a person, at two different coordinates knowing the topology of the geographic region in which the coordinates subsist. As well, line of sight 170 may be computed dynamically through electronic means such as the ability for line of sight communications including infrared or short range wireless communications including Bluetooth to be established as between the mobile computing devices 160 of pairs of the different individuals 150A, 150B, 150C. Alternatively, the line of sight 170 may be computed through computational means accounting for a relative altitude of each of the different individuals 150A, 150B, 150C, a horizontal distance between each of the different individuals 150A, 150B, 150C and any known impeding geographical or structural albeit temporary features of the geographical area 120.

Figure 2:
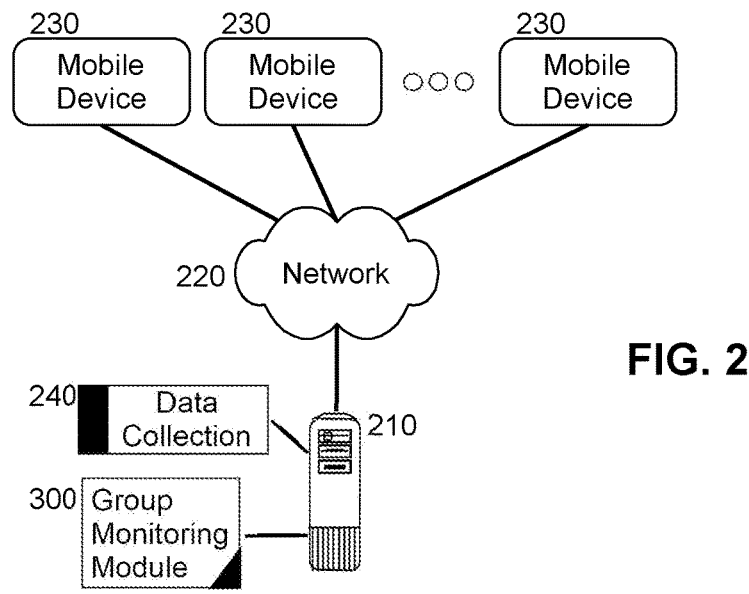
FIG. 2 is a schematic illustration of an electronic monitoring data processing system configured for detecting isolated group members; and, FIG. 3 is a flow chart illustrating a process for detecting isolated group members.

The process described in connection with FIG. 1 may be implemented in an electronic monitoring data processing system. In further illustration, FIG. 2 schematically shows an electronic monitoring data processing system configured for detecting isolated group members. The system includes a host computing platform 210 that includes one or more computers each with memory and at least one processor. The host computing platform 210 is communicatively coupled to different mobile computing devices 230 over computer communications network 220. A data collection application 240 executes in the memory of the host computing platform 210. The data collection application 240 collects data from the different mobile computing devices 230 of different individuals associated with one another in a group, including geographic positioning data, effective line of sight data between the pairs of the individuals in the group, and communicative interactivity data as between the mobile computing devices 230.

Of note, a group monitoring module 300, is coupled to the data collection application 240. The group monitoring module 300 includes program code that when executes in the memory of the host computing platform, is enabled to define the group of individuals each with a corresponding one of the mobile devices 230, collects geographic location data for each of the mobile devices 230 along with a degree to which line of sight exists between each of the individuals in the group interactivity data with others of the mobile devices 230. The program code yet further is enabled to compute a coefficient of isolation for each individual associated with a corresponding one of the mobile device 230 based upon the collected geographic location data and a degree to which line of sight exists between each of the individuals in the group, and optionally, collected interactivity data between the mobile device 230. In this regard, each of the coefficients indicates a degree of isolation of a corresponding one of the individuals. Finally, on condition of one of the computed coefficients indicating a threshold isolation of a corresponding one of the individuals, an alert is transmitted to a third party monitoring the individuals, or to at least one of the individuals.

Figure 3:
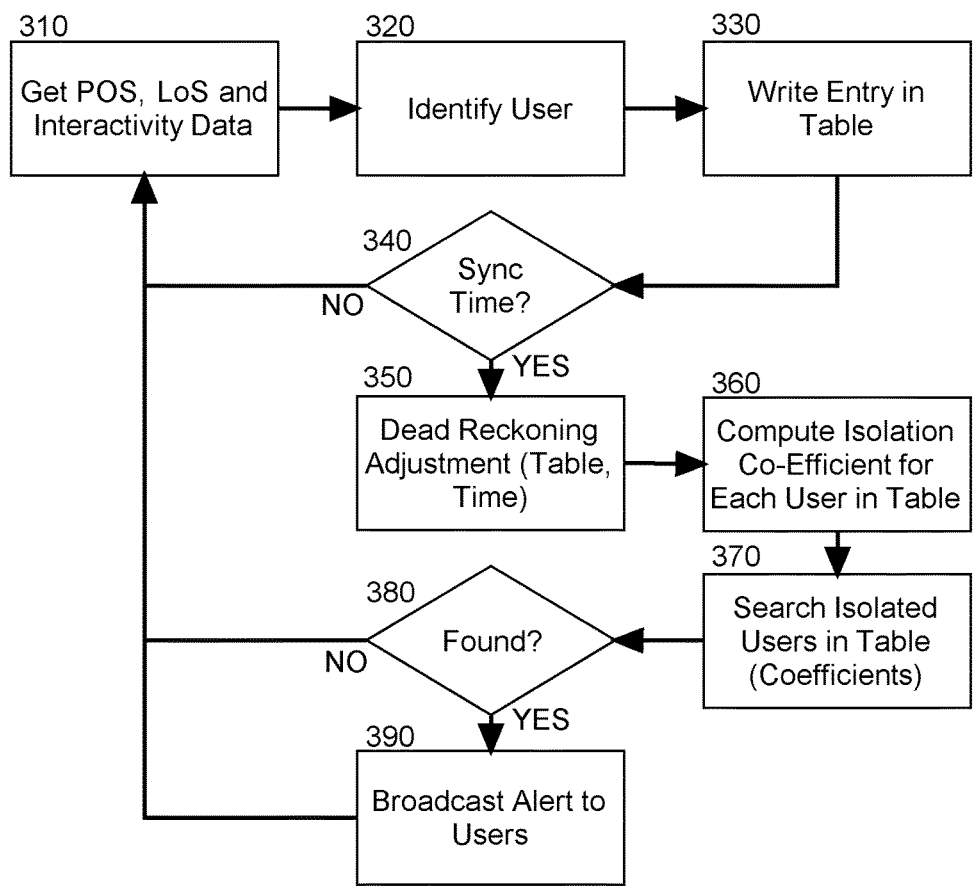

In even yet further illustration of the operation of the group monitoring module 300, FIG. 3 is a flow chart illustrating a process for detecting isolated group members. Beginning in block 310, geographical positioning data, an indication of effective line of sight and communications interactivity data is collected and in block 320 an individual associated with the data is identified. In block 330, an entry is updated in a table for the identified individual. In decision block 340 it is determined if it is time to perform periodic synchronization of the mobile devices. If not, in block 310 additional geographical positioning data, an indication of effective line of sight and communications interactivity data is collected, in block 320 an individual associated with the additionally collected data is identified and in block 330, an entry is updated in a table for the identified individual.

In decision block 340, if it is determined that it is time to perform periodic synchronization of the mobile devices, in block 350, the geographic positioning data is adjusted by dead reckoning for the time specified for periodic synchronization. Specifically, a geographic position of each of the mobile devices is extrapolated based upon a prior known position, a velocity and direction of movement of the mobile devices and an estimated elapsed time since a measurement of the prior known position. In block 360, an isolation coefficient is computed for each individual in the table. In particular, the coefficient is computed as a function of the geographic position and a determination of presence of an effective line of sight for the individual as between one more others of the individuals. Optionally, the computation of the coefficient also accounts for the degree of interactivity with other individuals.

Thereafter, the table is searched to identify one or more of the individuals with a coefficient that exceeds a threshold value. In decision block 380, if a particular individual in the table is located with a coefficient that exceeds the threshold value, in block 390, an alert is broadcast to one or more of the individuals in the group indicating that the particular individual has become isolated with respect to the other individuals of the group. In this regard, the nature of the alert can vary based upon whether or not the particular individual is known to be stationary, or moving with velocity in a manner likely to cause the coefficient to be computed in greater variance to the threshold value. Yet further, the alert can vary to the extent that the particular individual is determined to move with velocity towards a known hazard such as a busy road or geographically dangerous feature. Even yet further, the alert can vary to the extent that the geographic position of the particular individual is known to exist in a pre-specified safe zone such as in a school bus or bathroom, or only for a period of time below a threshold value such as sixty seconds. As well, the state of weather can be determined to weight the threshold value as weather affects the determination of the presence or absence of an effective line of sight.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of detecting isolated group members comprising:
defining in memory of a master computer, a group of individuals each with a corresponding one of a multiplicity of registered mobile devices;
collecting in the master computer geographic location data for each of the mobile devices along with a degree to which line of sight exists between each of the individuals in the group;
computing a coefficient of isolation for each of the individuals based upon the collected geographic location data and the degree to which for each one of the individuals in the group, line of sight exists between each other of the individuals in the group, each of the coefficients indicating a degree of isolation of a corresponding one of the individuals; and, storing each coefficient of isolation in a table and providing an interface to each coefficient of isolation in the table.

2. The method of claim 1, wherein on condition of one of the computed coefficients indicating a threshold isolation of a corresponding one of the individuals, transmitting an alert to at least one of the individuals.

3. The method of claim 1, wherein interactivity data is collected for each of the individuals in the group, a degree of communicative interactivity for each of the individuals is computed and the computed degree of communicative interactivity for each one of the individuals is factored into the computation of a corresponding co-efficient.

4. The method of claim 3, wherein the interactivity data collected for a corresponding one of the individuals indicates a recency of communications between the corresponding one of the individuals and at least one other of the individuals in the group.

5. The method of claim 1, wherein the coefficient is computed for each of the individuals based upon a statistical function of multiple different samples of the collected geographic location data and the degree to which line of sight exists between each of the individuals in the group.

6. The method of claim 1, wherein the the geographic location data and the degree to which line of sight exists between each of the individuals in the group are collected on a synchronized basis.

7. The method of claim 1, wherein the geographic location data is collected at different times for respectively different ones of the individuals and then logically synchronized by dead reckoning the geographic location data for each of the individuals for a specified moment in time.

8. An electronic monitoring data processing system configured for detecting isolated group members, the system comprising:

a host computing platform comprising one or more computers, each with memory and at least one processor; and, a group monitoring module executing in the memory of the host computing platform, the module comprising program code that when executing in the memory of the host computing platform, defines a group of individuals each with a corresponding one of a multiplicity of registered mobile devices communicatively coupled to the host computing platform, collects computer geographic location data for each of the mobile devices along with a degree to which line of sight exists between each of the individuals in the group, computes a coefficient of isolation for each of the individuals based upon the collected geographic location data and the degree to which for each one of the individuals in the group, line of sight exists between each other of the individuals in the group, each of the coefficients indicating a degree of isolation of a corresponding one of the individuals, and, storing each coefficient of isolation in a table and providing an interface to each coefficient of isolation in the table.

9. The system of claim 8, wherein on condition of one of the computed coefficients indicating a threshold isolation of a corresponding one of the individuals, an alert is transmitted to at least one of the individuals.

10. The system of claim 8, wherein interactivity data is collected for each of the individuals in the group, a degree of communicative interactivity for each of the individuals is computed and the computed degree of communicative interactivity for each one of the individuals is factored into the computation of a corresponding co-efficient.

11. The system of claim 8, wherein the coefficient is computed for each of the individuals based upon a statistical function of multiple different samples of the collected geographic location data and the degree to which line of sight exists between each of the individuals in the group.

12. The system of claim 8, wherein the geographic location data and the degree to which line of sight exists between each of the individuals in the group are collected on a synchronized basis.

13. The system of claim 8, wherein the geographic location data is collected at different times for respectively different ones of the individuals and then logically synchronized by dead reckoning the geographic location data for each of the individuals for a specified moment in time.

14. A computer program product for detecting isolated group members, the computer program product comprising a computer readable storage medium having program instructions embodied therewith, the program instructions executable by a device to cause the device to perform a method comprising:

defining in memory of a master computer, a group of individuals each with a corresponding one of a multiplicity of registered mobile devices;

collecting in the master computer geographic location data for each of the mobile devices along with a degree to which line of sight exists between each of the individuals in the group;

computing a coefficient of isolation for each of the individuals based upon the collected geographic location data and the degree to which for each one of the individuals in the group, line of sight exists between each other of the individuals in the group, each of the coefficients indicating a degree of isolation of a corresponding one of the individuals; and, storing each coefficient of isolation in a table and providing an interface to each coefficient of isolation in the table.

15. The computer program product of claim 14, wherein on condition of one of the computed coefficients indicating a threshold isolation of a corresponding one of the individuals, an alert is transmitted to at least one of the individuals.

16. The computer program product of claim 14, wherein interactivity data is collected for each of the individuals in the group, a degree of communicative interactivity for each of the individuals is computed and the computed degree of communicative interactivity for each one of the individuals is factored into the computation of a corresponding co-efficient.

17. The computer program product of claim 14, wherein the interactivity data collected for a corresponding one of the individuals indicates a recency of communications between the corresponding one of the individuals and at least one other of the individuals in the group.

18. The computer program product of claim 14, wherein the coefficient is computed for each of the individuals based upon a statistical function of multiple different samples of the collected geographic location data and the degree to which line of sight exists between each of the individuals in the group.

19. The computer program product of claim 14, wherein the the geographic location data and the degree to which line of sight exists between each of the individuals in the group are collected on a synchronized basis.

20. The computer program product of claim 14, wherein the geographic location data is collected at different times for respectively different ones of the individuals and then logically synchronized by dead reckoning the geographic location data for each of the individuals for a specified moment in time.

* * * * *